Figures 1, 2:
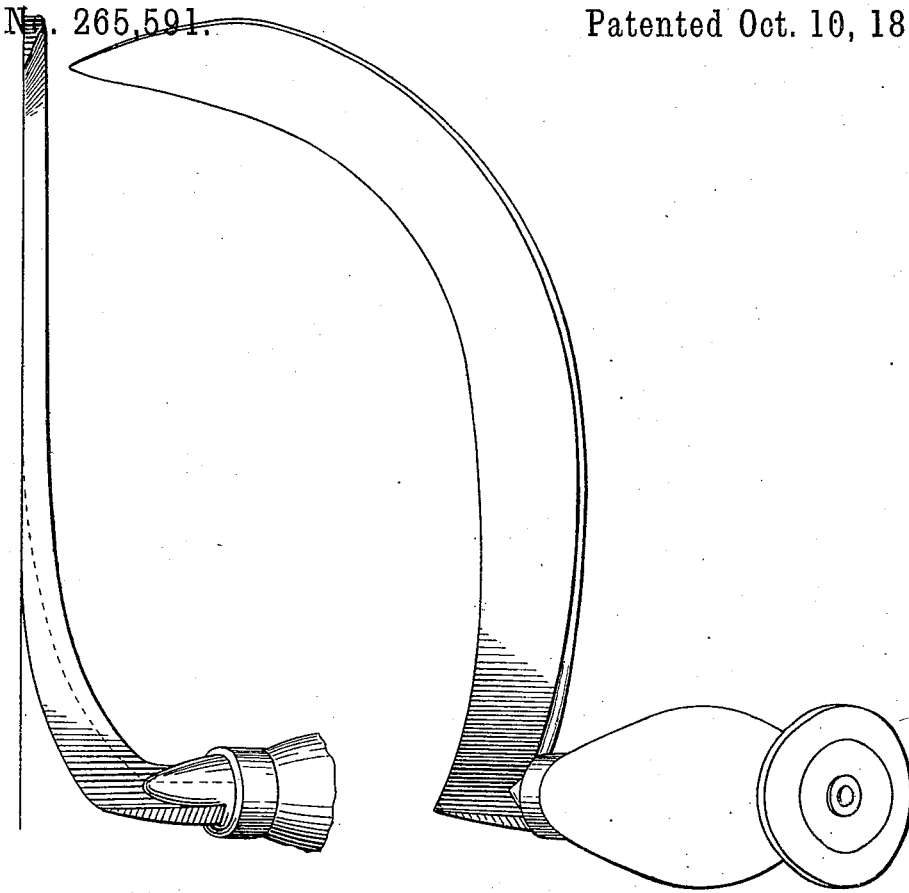

(Model.) 2 Sheets—Sheet 1.

D. FLETCHER.
IMPLEMENT FOR WEEDING, PRUNING AND SINGLING.

No. 265,591. Patented Oct. 10, 1882.

Witnesses:
A. Harvey
L. E. Noël

Inventor:
Dandy Fletcher
By J. Boursolle
Atty.

N. PETERS, Photo-Lithographer, Washington, D. C.

(Model.) 2 Sheets—Sheet 2.

D. FLETCHER.
IMPLEMENT FOR WEEDING, PRUNING AND SINGLING.

No. 265,591. Patented Oct. 10, 1882.

Witnesses:
A. Harvey
L. E. Noël

Inventor:
Dandy Fletcher
By J. Coursolle
Atty.

United States Patent Office.

DANDY FLETCHER, OF SANDWICH, ONTARIO, CANADA.

IMPLEMENT FOR WEEDING, PRUNING, AND SINGLING.

SPECIFICATION forming part of Letters Patent No. 265,591, dated October 10, 1882.

Application filed June 12, 1882. (Model.)

*To all whom it may concern:*

Be it known that I, DANDY FLETCHER, residing at Sandwich, in the county of Essex, in the Province of Ontario, Canada, gardener, have invented a new and useful implement for use in the garden and field in weeding, pruning, and the like, of which the following is a description.

The object of my invention is to provide an implement which shall replace the chop-hoe and the push-hoe for certain purposes hereinafter more particularly referred to, and one that may be placed in unskilled hands with the same or better results than the implements thus superseded when used by experienced and skilled operators, and the use of which will therefore effect a considerable saving in the cost of performing the operations in which it may be adopted, and at the same time enable the more efficient performance of the work, thus providing an implement acceptable to both the amateur and the professional gardener and farmer.

It is well known that the common chop-hoe is not adapted for use on beds of flowers, tender plants, seeds, and the like, as it destroys the form of the bed, cuts only part of the weeds, covers another part, and simply removes the remainder from one place to another, transplanting them to grow again, except when done in dry weather under a burning sun. It also necessitates the use of a rake after it. Nor can it be used to weed under the foliage of plants and flowers, on vine-hills, &c., without injury to the foliage and tender stems. When used in the field for chopping out in row and singling root crops a large proportion of the best plants are injured, and after one or more repetitions to remove the small sets the hoe did not cut at first it requires an experienced hand to perform the final singling out. The common push-hoe, although better adapted for some of these operations, is still unsatisfactory, as it is liable to damage bulbs and stems, becomes rapidly blunted, is useless on vine-borders, and, except for use on walks and alleys, requires to be handled by an expert. Later improvements, although better adapted for some of these operations, are still unsatisfactory in many respects, and my invention is designed to overcome these defects.

My new implement is adapted for weeding, singling, and pruning all sorts of plants in field and garden, and can be used by a smart boy with ease and with as much dispatch as by the best of men.

The accompanying drawings show my new implement.

Figure 3:
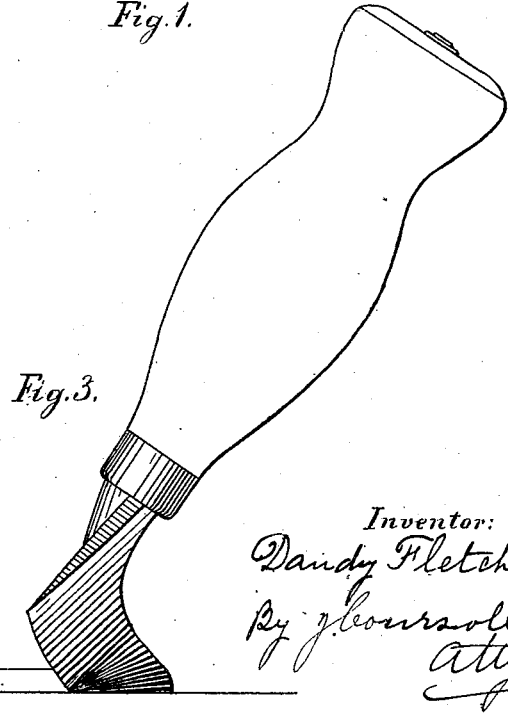
Figure 4:
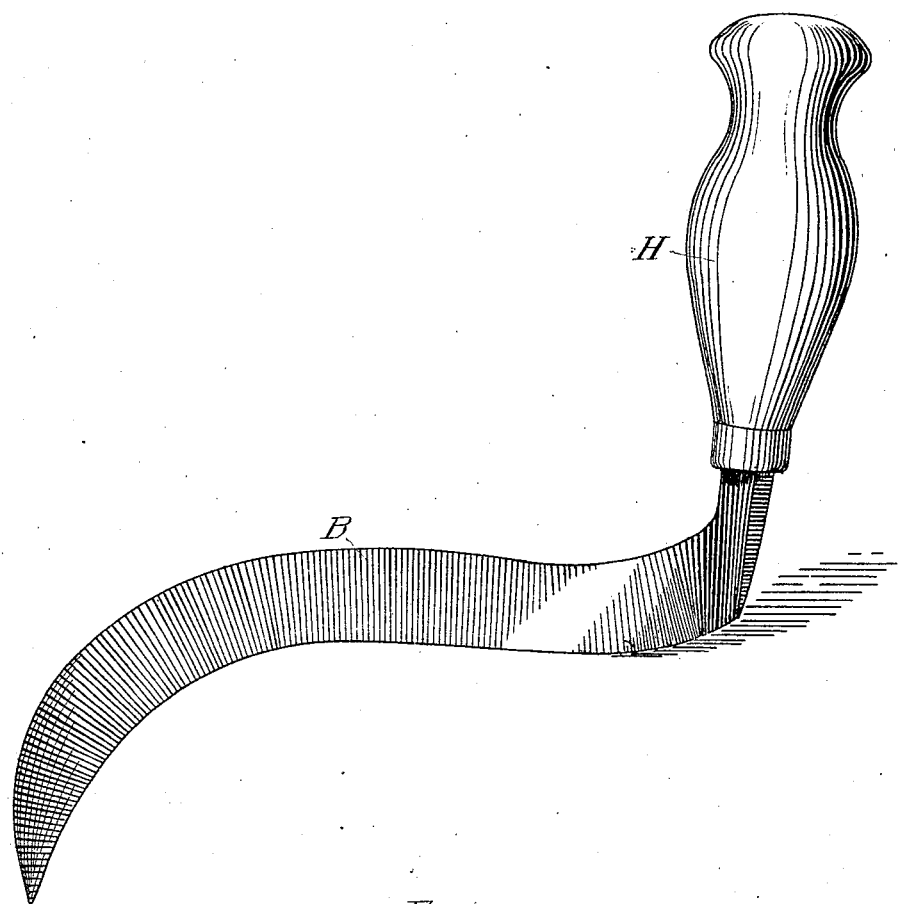

Figure 1 is a top view of the new garden-knife, the major portion of the blade lying flat on the plane. Fig. 2 is an end view, Fig. 3 is a side view, and Fig. 4 is a perspective view, of the same.

The new implement consists of a tempered steel blade, B, having a peculiar curve, twist, and set, H being the handle. Its scope or space of cut is equal to a large push hoe, and the peculiar line of the cutting-edge prevents the same being blunted too rapidly. When singling or pruning with the knife and moving it in the direction from right to left two ordinary thimbles may be used with advantage on the left hand, one on the first and the other on the second finger, in order to protect them against the point of the knife when putting the hand down to the soil to shield the stem and foliage from cutting.

I claim as my invention—

An implement for weeding, pruning, and singling, consisting of a tempered steel blade, hooked, flat in the plane of its curve, sharpened on the inner edge, and twisted upward and inward near the shank, and a handle at an angle of about sixty degrees into the plane of the forward part of the cutting-edge of the blade, substantially as described, and for the purpose set forth.

DANDY FLETCHER.

Witnesses:
JOHN McEWAN,
ALLOIS MARTEN.